(12) United States Patent
Takeshita et al.

(10) Patent No.: US 6,775,207 B2
(45) Date of Patent: Aug. 10, 2004

(54) DEVICE FOR DRIVING OPTICAL SYSTEM

(75) Inventors: Nobuo Takeshita, Tokyo (JP); Mitoru Yabe, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 83 days.

(21) Appl. No.: 10/292,700

(22) Filed: Nov. 13, 2002

(65) Prior Publication Data

US 2003/0218963 A1 Nov. 27, 2003

(30) Foreign Application Priority Data

May 23, 2002 (JP) .................................... P2002-148914

(51) Int. Cl.[7] .......................... G11B 7/095; G11B 17/00
(52) U.S. Cl. .................................. 369/44.15; 369/244
(58) Field of Search .......................... 369/44.15, 44.16, 369/244; 359/811, 813

(56) References Cited

U.S. PATENT DOCUMENTS 4,794,580 A * 12/1988 Ikedo et al. ............. 369/44.16
RE33,548 E    3/1991 Kime
5,699,340 A   12/1997 Lee et al.
6,342,978 B1 * 1/2002 Nishikawa et al. ......... 359/813

FOREIGN PATENT DOCUMENTS

JP    2001-297460 A    10/2001
JP    2001-319349 A    11/2001

* cited by examiner

*Primary Examiner*—George J. Letscher
(74) *Attorney, Agent, or Firm*—Birch, Stewart, Kolasch & Birch, LLP.

(57) ABSTRACT

An objective lens (1) for focusing light on an optical recording medium (not shown) and irradiating the same with the focused light is held on a lens holder (2). A support member (10) is provided on a base member (9) as a foundation of a device for driving optical system. The lens holder (2) is supported on the support member (10). Six linear elastic bodies (7a through 7f) of the same length are cylindrically shaped. The lens holder (2) is supported on the support member (10) by the linear elastic bodies (7a through 7f). A center of a circle formed by the ends of the linear elastic bodies (7a through 7f) is an axis of point symmetry thereof. Distances between adjacent ones of the ends of the linear elastic bodies (7a through 7f) are all the same.

7 Claims, 12 Drawing Sheets

MOVEMENT OF MOVABLE SIDE TERMINALS HAVING AXIS OF POINT SYMMETRY

MOVEMENT OF MOVABLE SIDE TERMINALS HAVING NO AXIS OF POINT SYMMETRY

DEVICE FOR DRIVING OPTICAL SYSTEM

This nonprovisional application claims priority under 35 U.S.C. § 119(a) on Patent Application No. 2002-148914 filed in Japan on May 23, 2002, which is herein incorporated by reference.

BACKGROUND OF THE INVENTION

1. Field of the Invention

The present invention relates to a device for driving optical system for writing or reading information to and from an optical recording medium such as DVD. More particularly, it relates to a supporting mechanism and a driving mechanism for the optical system.

2. Description of the Background Art

A well-known device for driving optical system is introduced in Japanese Patent Application Laid-Open No. 2001-297460. FIG. 17 is a perspective view illustrating a background-art device for driving optical system disclosed therein. The device given in FIG. 17 is a driving device for optical system in which an objective lens 101 is controlled by moving coil system. The objective lens 101 is fixed to a lens holder 102. Provided on the side surfaces of the lens holder 102 are six strip metal plates 103a through 103c, and 103d through 103f. Print coils 104a and 104b are fixed to other side surfaces of the lens holder 102. A base member 105 has a suspension holder 106 for supporting the lens holder 102, and permanent magnets 107a through 107d for controlling the lens holder 102. The strip metal plates 103a through 103c and 103d through 103f are connected to the suspension holder 106 by suspension wires (linear elastic bodies) 108a through 108c and 108d through 108f, respectively, to support the lens holder 102 on the base 105 member. The print coil 104a is interposed between the permanent magnets 107a and 107b, and the print coil 104b is interposed between the permanent magnets 107c and 107d.

Next, the operations of the background-art device will be discussed. When a current is supplied to focusing coils embedded in the print coils 104a and 104b (not shown) so as to generate electromagnetic forces to act on the coils in the same direction, the lens holder 102 is displaced in the direction Fo of an optical axis (hereinafter alternatively referred to as focusing direction). Further, when a current is supplied to tracking coils embedded in the print coils 104a and 104b (not shown) so as to generate electromagnetic forces to act on the coils in the same direction, the lens holder 102 is displaced in a tracking direction Tk that is a radial direction of an optical recording medium. Still further, when a current is supplied to the focusing coils (not shown) so as to generate electromagnetic forces to act on the coils with the opposite directions, rotation moment about the tracking direction Tk as an axis thereof is applied to the lens holder 102. As a result, the lens holder 102 is rotated in a tilting direction Ti. FIG. 18 is a sectional view illustrating how the lens holder is rotated in the tilting direction Ti. If the electromagnetic forces are generated to act on the focusing coils (not shown) in the opposite directions, the strip metal plates 103a and 103c are displaced and distorted towards the opposite directions by the same amount. As a result, a center of the strip metal plate 103b will be a center O of rotation in the tilting direction Ti, thus rotating the lens holder 102 to an angle θ and displacing the same in the tilting direction Ti. Triaxial drive, namely, drive in the focusing direction Fo, tracking direction Tk, and in the tilting direction Ti, is thereby allowed.

For realizing triaxial drive, the background-art device requires two electric wires for supplying current to the focusing coil in the print coil 104a, two electric wires for supplying current to the focusing coil in the print coil 104b, and two electric wires for supplying current to the tracking coils in the print coils 104a and 104b, respectively. Namely, a total of six electric wires are required. For this reason, the six suspension wires 108a through 108f for supporting the lens holder 102 are also used as electric wires for current supply in the background-art device.

In the background-art device for driving optical system, however, the suspension wires 108a through 108f should contact the strip metal plates 103a through 103f on the side of the lens holder 102. Therefore, the background-art device necessarily requires six strip metal plates, leading to the increase in number of parts. As a result, the problems involving rise in cost of the parts and increase in number of assembly steps have been unavoidable. In the background-art device, further, the suspension wires 108a through 108f and the strip metal plates 103a through 103f should be respectively connected. Therefore, variations of the parts may occur in the assembled condition, resulting in unevenness in performance of the devices.

SUMMARY OF THE INVENTION

It is therefore an object of the present invention to provide a device for driving optical system only requiring at least six suspension wires (linear elastic bodies) for supporting a lens holder while allowing triaxial drive, namely, drive in a focusing direction, in a tracking direction, and in a tilting direction.

The device for driving optical system includes an optical system, a holder, a support member, a support system, a focusing drive system, a tracking drive system, and a tilting drive system. The optical system focuses light on an optical recording medium and irradiating the optical recording medium with focused light. The holder holds the optical system. The support member supports the holder. The support system includes at least six linear elastic bodies having the same length. The linear elastic bodies respectively have one ends fixed to the support member and arranged thereon approximately in a circle, and other ends fixed to the holder and arranged thereon approximately in a circle, to support the holder on the support member. The focusing drive system drives the holder in a direction of an optical axis of the optical system. The tracking drive system drives the holder in a radial direction of the optical recording medium. The tilting drive system drives the holder in a direction in which rotation moment generates about an axis. This axis is perpendicular to the direction of the optical axis and to the radial direction of the optical recording medium.

One ends of the at least six linear elastic bodies are fixed to the support member and arranged approximately in a circle thereon, and other ends of the six linear elastic bodies are fixed to the holder and arranged approximately in a circle thereon. The holder is thereby supported on the support member. Therefore, while allowing triaxial drive, cost reduction of parts is realized and the number of assembly steps is reduced. Further, variations of the parts can be reduced in the assembled condition, thus reducing the degree of unevenness in performance of the devices.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
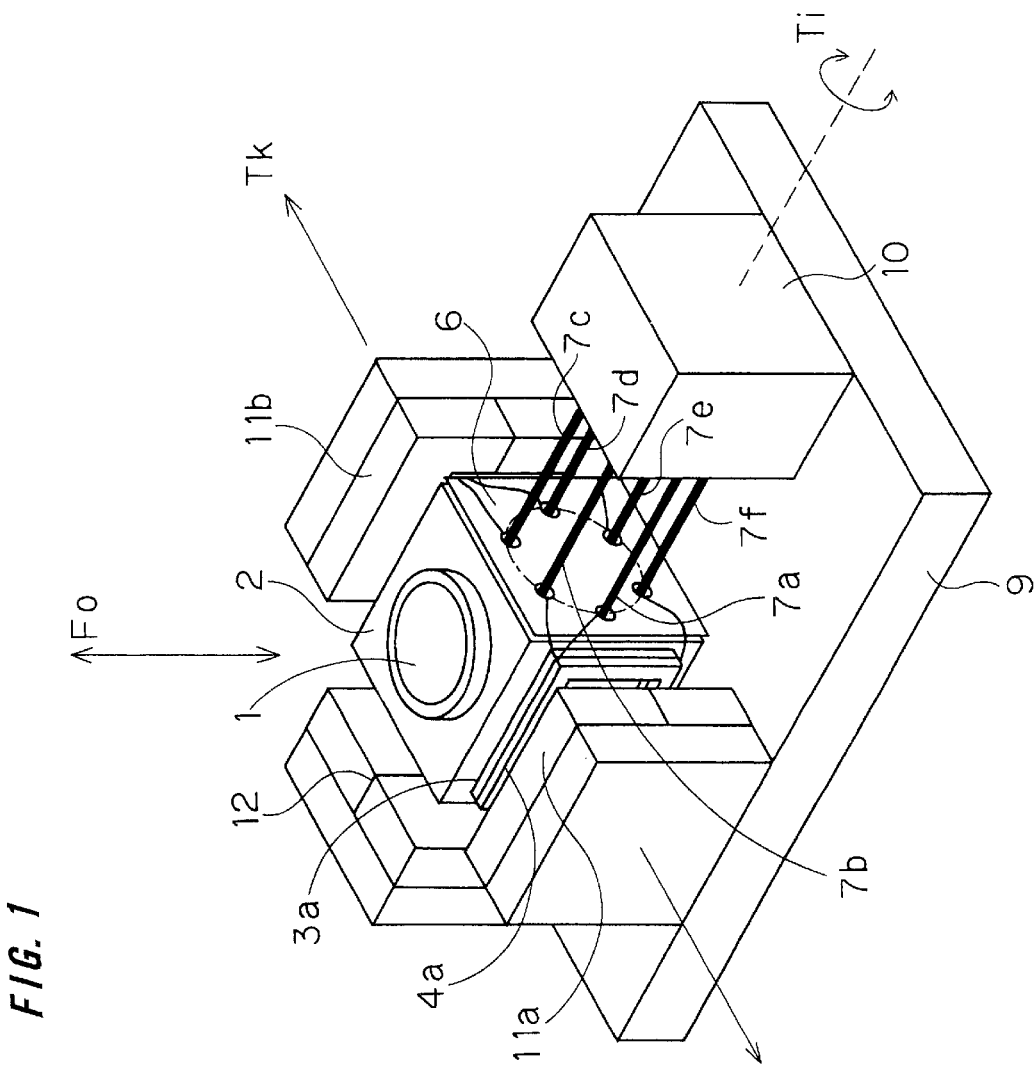
FIG. 1 is a perspective view illustrating a device for driving optical system according to a first preferred embodiment of the present invention.
Figure 2:
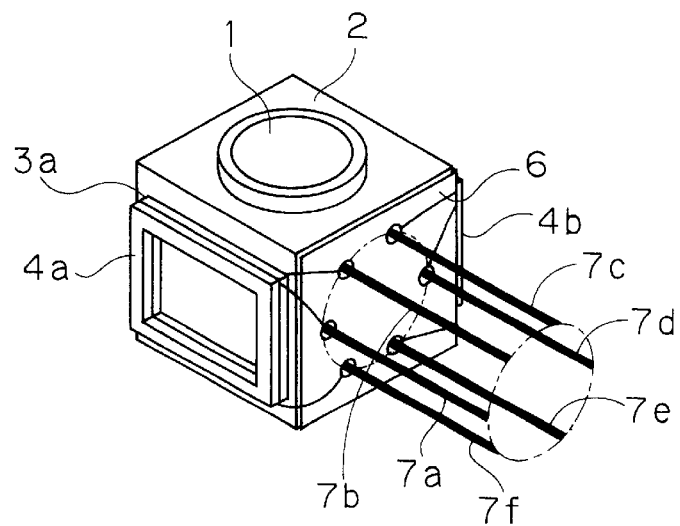
FIGS. 2 and 3 are perspective views each illustrating a lens holder of the device according to the first preferred embodiment of the present invention.
Figure 3:
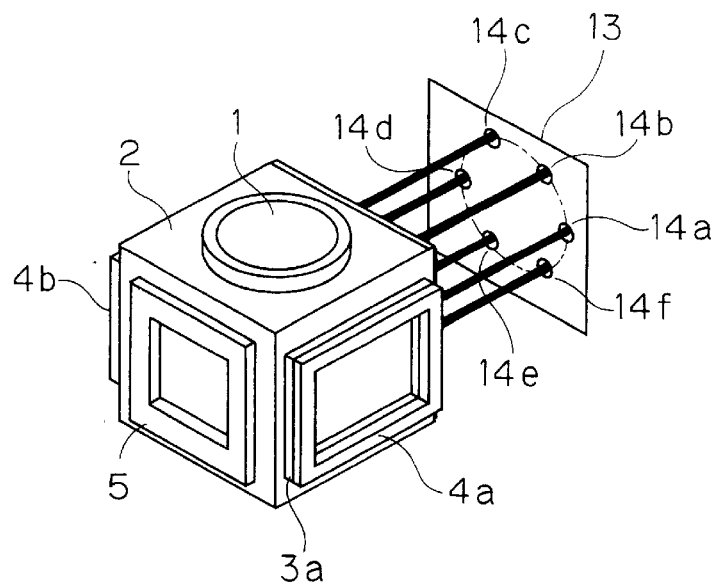
Figure 4:
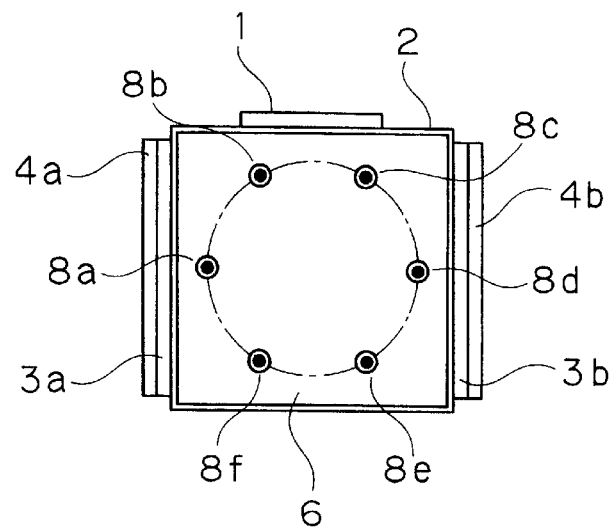
FIG. 4 is a plan view illustrating a movable side substrate according to the first preferred embodiment of the present invention.

FIG. 1 is a perspective view illustrating a device for driving optical system according to the first preferred embodiment of the present invention. Only a lens holder of the device is illustrated in each perspective view of FIGS. 2 and 3. An objective lens 1 for focusing light on an optical recording medium (not shown) and irradiating the same with the focused light is held on a lens holder 2. The lens holder 2 has a focusing coil 3, a tilting coil 4, and a tracking coil 5 provided on three surfaces thereof adjacent to the surface for holding the objective lens 1. The focusing coil 3 includes two coils 3a and 3b as illustrated in FIG. 4 provided in parallel on the surfaces of the lens holder 2. The coils 3a and 3b have the same winding direction. The tilting coil 4 includes two coils 4a and 4b provided in parallel, overlying the coils 3a and 3b, respectively. The coils 4a and 4b have different winding directions. The tracking coil 5 is provided on the remaining surface of the foregoing three surfaces. Further, the lens holder 2 has a movable side substrate 6 on the surface thereof opposite to that for holding the tracking coil 5.

FIG. 4 is a plan view illustrating the movable side substrate. Six movable side terminals 8a through 8f are provided on the movable side substrate 6 for fixing the ends of six linear elastic bodies 7a through 7f, respectively. These movable side terminals 8a through 8f are arranged in a circle. A center of this circle is an axis of point symmetry of the movable side terminals 8a through 8f. Further, distances between adjacent ones of the movable side terminals 8a through 8f are all the same on the movable side substrate 6. For example, the distance between the movable side terminals 8a and 8b is the same as the distance between the terminals 8b and 8c.

A support member 10 is provided on a base member 9 as a foundation of the device for driving optical system. The base member 9 and the support member 10 serve as a support for the lens holder 2, which will be applied to the preferred embodiments to be described later. A permanent magnet 11 for focusing and tilting control, and a permanent magnet 12 for tracking control are provided on the base member 9. The permanent magnet 11 includes two permanent magnets 11a and 11b facing each other on the base member 9. The permanent magnets 11a and 11b for focusing and tilting control are each vertically polarized. The permanent magnet 12 is arranged on the base member 9 to face the support member 10. The permanent magnet 12 is horizontally polarized. The base member 9 generally includes metal such as magnetic material. Further, a fixed side substrate 13 is provided on the surface of the support member 10 for supporting the lens holder 2.

Figure 5:
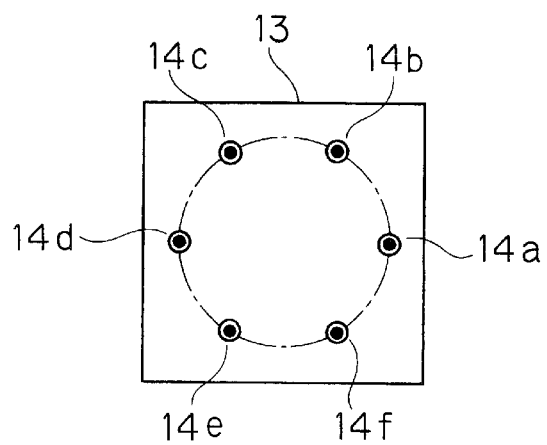
FIG. 5 is a plan view illustrating a fixed side substrate according to the first preferred embodiment of the present invention.

FIG. 5 is a plan view illustrating the fixed side substrate. Six fixed side terminals 14a through 14f are provided on the fixed side substrate 13 for further fixing the ends of the six linear elastic bodies 7a through 7f, respectively. These fixed side terminals 14a through 14f are also arranged in a circle. A center of this circle is an axis of point symmetry of the fixed side terminals 14a through 14f. Distances between adjacent ones of the fixed side terminals 14a through 14f are all the same on the fixed side substrate 13. The movable side terminals 8a through 8f and the fixed side terminals 14a through 14f are symmetrically arranged in mirror image, respectively. Further, the circle formed by the movable side terminals 8a through 8f and that formed by the fixed side terminals 14a through 14f are approximately the same in size.

In the device for driving optical system according to the first preferred embodiment, the lens holder 2 is so arranged to be surrounded by the support member 10, by the permanent magnets 11a and 11b each for focusing and tilting control, and by the permanent magnet 12 for tracking control, and to be supported on the support member 10 by the six linear elastic bodies 7a through 7f of the same length. The focusing coil 3 and the tilting coil 4 each face the permanent magnets 11a and 11b. The tracking coil 5 faces the permanent magnet 12.

The linear elastic bodies 7a through 7f respectively connect the movable side terminals 8a through 8f and the fixed side terminals 14a through 14f. The linear elastic bodies 7a through 7f are formed of the same material. The ends of the linear elastic bodies 7a through 7f are arranged in the same manner as those of the movable side terminals 8a through 8f and the fixed side terminals 14a through 14f, namely, they are arranged in a circle. A center of the circle formed by the ends of the linear elastic bodies 7a through 7f is an axis of point symmetry thereof. Further, distances between adjacent ones of the ends of the linear elastic bodies 7a through 7f are all the same. As seen from FIGS. 2 and 3, the linear elastic bodies 7a through 7f are thereby cylindrically shaped in the device of the first preferred embodiment. In addition to the operation for supporting the lens holder 2 on the support member 10, the linear elastic bodies 7a through 7f are also operable to supply current to the focusing coil 3, to the tilting coil 4, and to the tracking coil 5. The movable side terminals 8a through 8f are therefore connected to the focusing coil 3, to the tilting coil 4, and to the tracking coil 5 by electric wires.

Next, the operations of the device for driving optical system according to the first preferred embodiment will be discussed. In FIG. 1, a direction of an optical axis in which light is focused on an optical recording medium (not shown) for irradiating the medium with the focused light is referred to as a focusing direction Fo (vertical direction), and a radial direction of the optical recording medium is referred to as a tracking direction Tk (horizontal direction). Further, defining a direction perpendicular to the focusing direction Fo and to the tracking direction Tk as an axis, a direction in which rotation moment generates about this axis is referred to as a tilting direction Ti.

The device for driving optical system of the first preferred embodiment is controlled by moving coil system. That is, by supplying current to each coil attached to the lens holder 2, magnetic force is generated between each coil and each permanent magnet provided on the base member 9. The magnetic force thus generated is used to control the position of the lens holder 2. The objective lens 1 is operable to focus light on the optical recording medium (not shown). On the other hand, focal point shift occurs by vertical movement of the optical recording medium such as wobble of the surface thereof. As a countermeasure therefor, in the device for driving optical system of the first preferred embodiment, a focusing sensor (not shown) is provided which is directed for well-known astigmatic compensation, for example. This focusing sensor detects the focal point shift, and applies a signal based on the amount of the focal point shift to the focusing coil 3. As a result, the lens holder 2 is displaced in the focusing direction Fo, by which focusing control is realized.

For reading information represented by bit sequence on the optical recording medium (not shown), the objective lens 1 is also operable to irradiate this bit sequence with the focused light. On the other hand, the objective lens 1 may cause track shift by eccentricity of the optical recording medium, for example. As a countermeasure therefor, in the device of the first preferred embodiment, a tracking sensor (not shown) is provided which is directed for well-known differential push-pull, for example. This tracking sensor detects the track shift, and applies a signal based on the amount of the track shift to the tracking coil 5. As a result, the lens holder 2 is displaced in the tracking direction Tk, by which tracking control is realized. During focusing control and tracking control as described, the linear elastic bodies 7a through 7f are cooperatively distorted toward the same direction. As a result, the objective lens 1 can be displaced by the desirable amount.

Due to the distortion of the optical recording medium (not shown) and wobble of the surface of the same resulting from rotative movement, the objective lens 1 may be tilted in the tilting direction Ti relative to the surface of the optical recording medium. Such tilt in the tilting direction Ti results in optical aberration and eventually, results in deterioration of a reproduced recording signal. As a countermeasure therefor, in the device of the first preferred embodiment, a well-known sensor system (not shown) is provided. This sensor system detects the amount of the tilt, and applies a signal based on this amount to the tilting coil 4. As a result, the lens holder 2 is rotated in the tilting direction Ti, by which tilting control is realized. In the device of the first preferred embodiment, the lens holder 2 is supported on the support member 10 by the linear elastic bodies 7a through 7f of cylindrical configuration. Therefore, when the lens holder 2 is rotated in the tilting direction Ti by tilting control relative to the support member 10, the movable side terminals 8a through 8f merely move to the positions respectively relative to those of the fixed side terminals 14a through 14f. Further, the linear elastic bodies 7a through 7f all have the same length. Therefore, in the device of the first preferred embodiment, bending stress is not caused in the longitudinal direction of the linear elastic body 7. A force is generated only in the tilting direction Ti. As a result, the device of the first preferred embodiment does not require six strip metal plates. The lens holder 2 can be supported only by the six linear elastic bodies 7a through 7f, namely, by the reduced number of parts. Further, the lens holder 2 can be tilted in the tilting direction Ti by a desirable angle.

In the device for driving optical system of the first preferred embodiment, the ends of the linear elastic bodies 7a through 7f are shown to have an axis of symmetry thereof. However, such axis is not essential. Namely, even when the ends of the linear elastic bodies 7a through 7f have no axis of point symmetry, the elastic bodies 7a through 7f are still cylindrically shaped, thereby rotating the lens holder 2 in the tilting direction by a desirable angle. When the ends of the linear elastic bodies 7a through 7f have an axis of point symmetry as in the first preferred embodiment, the elastic bodies 7a through 7f only receive a couple of forces acting thereon as a resultant force of a reaction force generated by tilting control. In contrast, when these ends have no axis of point symmetry, the elastic bodies 7a through 7f receive a translational force acting thereon in addition to the couple of forces as a resultant force of the reaction force generated by tilting control. In view of this, the linear elastic bodies 7a through 7f should preferably have an axis of symmetry thereof, to reduce the amount of interference in focusing control and tracking control to be caused by tilting control.

Figure 6B:
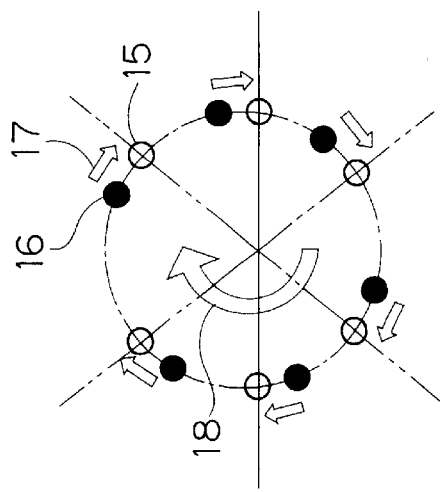
FIGS. 6A and 6B are conceptual views each illustrating movement of movable side terminals caused by tilting control according to the first preferred embodiment of the present invention.
Figure 6A:
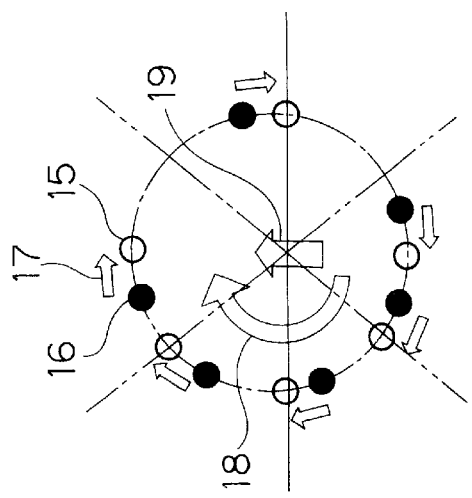

FIG. 6 is a conceptual view illustrating movement of the movable side terminals 8a through 8f caused by tilting control. Positions of the movable side terminals 8a through 8f before tilting control are represented by white circles 15, and positions of those after tilting control are represented by black circles 16. After subjection to tilting control, the movable side terminals 8a through 8f each receive a reaction force 17 acting thereon. When the ends of the elastic bodies 7a through 7f have no axis of point symmetry, a resultant force of the reaction forces 17 is a couple of forces 18 and a translational force 19 as seen from FIG. 6A. When these ends have an axis of point symmetry, on the other hand, only the couple of forces 18 is generated as a resultant force of the reaction forces 17 as seen from FIG. 6B. Accordingly, when the ends of the elastic bodies 7a through 7f have no axis of point symmetry, the translational force 19 generated by tilting control will interfere in focusing and tracking control. In contrast, when these ends have an axis of point symmetry, there is no translational force 19 to be generated by tilting control, thus causing no interference in focusing and tracking control.

In the device for driving optical system of the first preferred embodiment, further, all the distances between adjacent ones of the linear elastic bodies 7a through 7f are shown to be the same. However, such uniformity in distance is not essential. Namely, even when the ends of the elastic bodies 7a through 7f have nonuniformity in distance therebetween, the elastic bodies 7a through 7f are still cylindrically shaped. The lens holder 2 is thereby rotated in the tilting direction by a desirable angle. When the distances between adjacent ones of the elastic bodies 7a through 7f are all the same as in the first preferred embodiment, there occurs no asymmetry of reaction forces, leading to stable control for driving operations. As a result, the ends of the linear elastic bodies 7a through 7f should preferably have uniformity in distance therebetween.

In the first preferred embodiment, the lens holder 2 is supported on the support member 10 by the six linear elastic bodies 7a through 7f. However, the number of the linear elastic body may not be limited to this. As long as the linear elastic body is arranged in the same manner as that in the first preferred embodiment, the same effect can be obtained.

<Second Preferred Embodiment>

Figure 7:
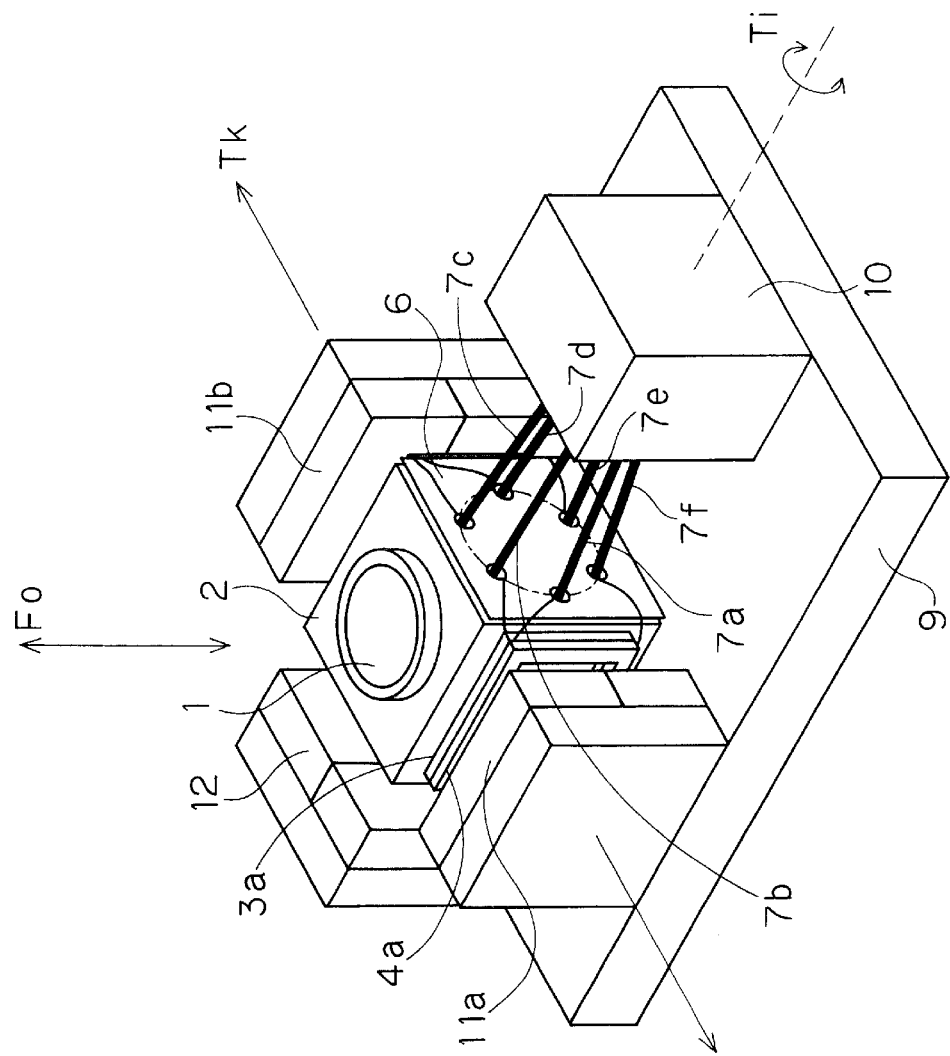
FIG. 7 is a perspective view illustrating a device for driving optical system according to a second preferred embodiment of the present invention.
Figure 8:
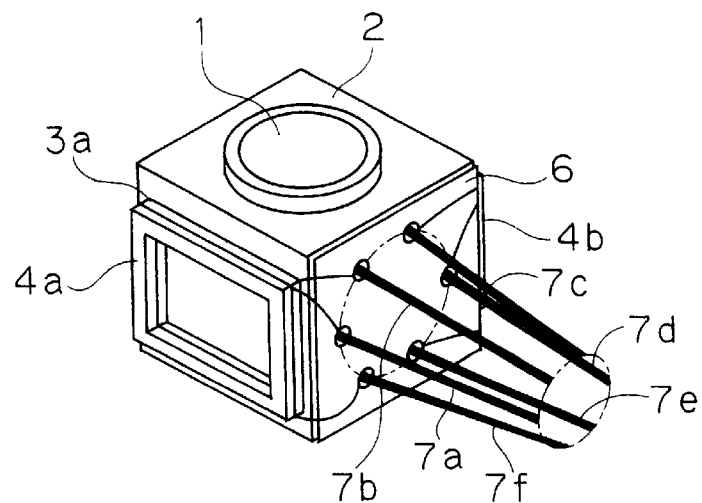
FIGS. 8 and 9 are perspective views each illustrating a lens holder of the device according to the second preferred embodiment of the present invention.
Figure 9:
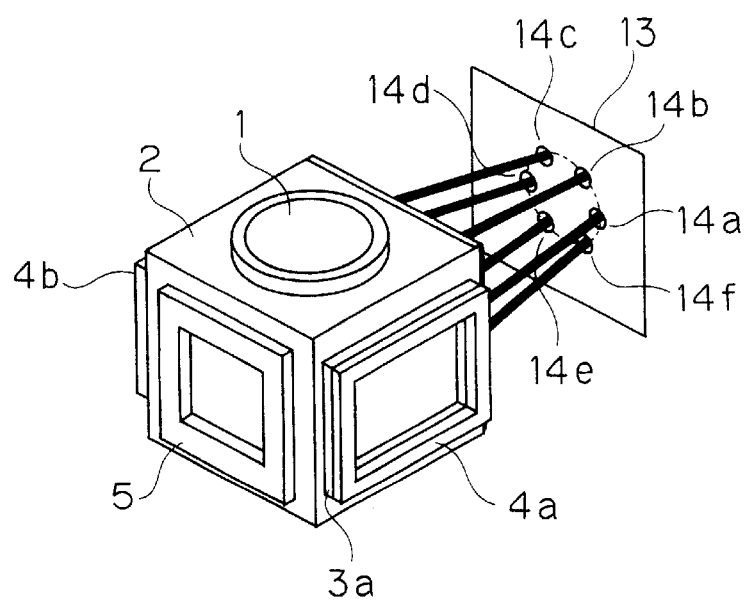

FIG. 7 is a perspective view illustrating a device for driving optical system according to the second preferred embodiment of the present invention. Only a lens holder of the device is illustrated in each perspective view of FIGS. 8 and 9. The structure of the lens holder 2 is the same as that in the first preferred embodiment. The objective lens 1 for focusing light on an optical recording medium (not shown) and irradiating the same with the focused light is held on the lens holder 2. The lens holder has the focusing coil 3, the tilting coil 4, and the tracking coil 5 provided on three surfaces thereof adjacent to the surface for holding the objective lens 1. Further, the lens holder 2 has the movable side substrate 6 provided on the surface thereof opposite to that for holding the tracking coil 5.

Figure 10:
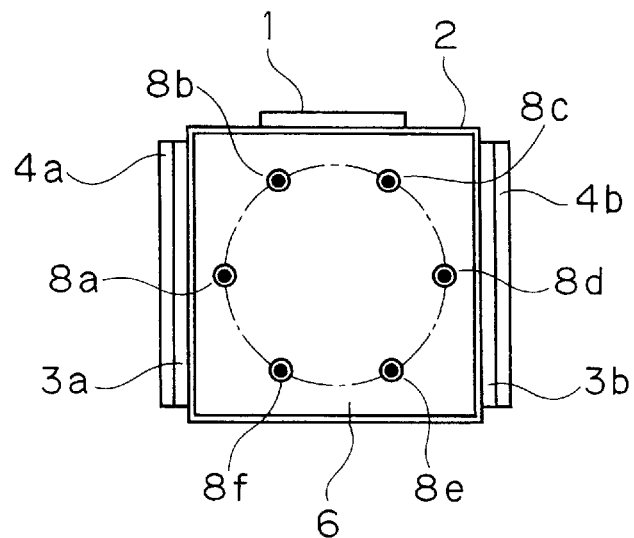
FIG. 10 is a plan view illustrating a movable side substrate according to the second preferred embodiment of the present invention.

FIG. 10 is a plan view illustrating the movable side substrate. The six movable side terminals 8a through 8f are provided on the movable side substrate 6 for fixing the ends of the six linear elastic bodies 7a through 7f, respectively. These movable side terminals 8a through 8f are arranged in a circle. A center of this circle is an axis of point symmetry of the movable side terminals 8a through 8f. Further, distances between adjacent ones of the movable side terminals 8a through 8f are all the same on the movable side substrate 6.

The structure of the base member 9 as a foundation of the device is the same as that in the first preferred embodiment. More particularly, the base member 9 holds the support member 10 provided thereon for supporting the lens holder 2. Further provided on the base member 9 are the permanent magnet 11 for focusing and tilting control, and the permanent magnet 12 for tracking control. Further, the fixed side substrate 13 is provided on the surface of the support member 10 for supporting the lens holder 2.

Figure 11:
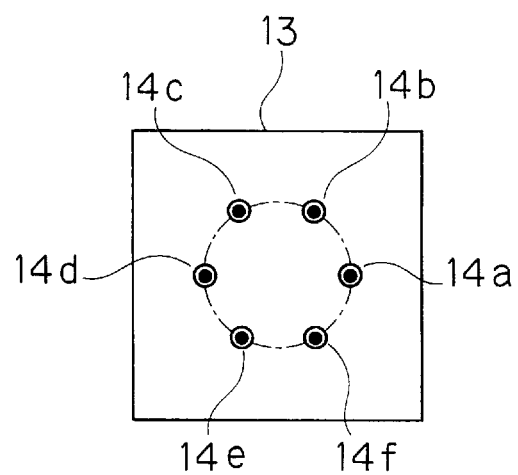
FIG. 11 is a plan view illustrating a fixed side substrate according to the second preferred embodiment of the present invention.

FIG. 11 is a plan view illustrating the fixed side substrate. The six fixed side terminals 14a through 14f are provided on the fixed side substrate 13 for further fixing the ends of the six linear elastic bodies 7a through 7f, respectively. These fixed side terminals 14a through 14f are also arranged in a circle. A center of this circle is an axis of point symmetry of the fixed side terminals 14a through 14f. Distances between adjacent ones of the fixed side terminals 14a through 14f are all the same on the fixed side substrate 13. Contrary to the first preferred embodiment, the circle formed by the fixed side terminals 14a through 14f is smaller in size than the circle formed by the movable side terminals 8a through 8f.

Similar to the first preferred embodiment, the movable side substrate 6 and the fixed side substrate 13 are also connected by the six linear elastic bodies 7a through 7f having the same length, to support the lens holder 2 on the support member 10. The ends of the linear elastic bodies 7a through 7f are arranged in the same manner as those of the movable side terminals 8a through 8f and the fixed side terminals 14a through 14f, namely, they are arranged in a circle. Accordingly, the circle formed by ends of the elastic bodies 7a through 7f on the fixed side substrate 13 is smaller in size than the one formed by the ends of the elastic bodies 7a through 7f on the movable side substrate 6. As seen from FIGS. 8 and 9, the linear elastic bodies 7a through 8f are thereby conically shaped, by which the second preferred embodiment is characteristically distinct from the first preferred embodiment where the elastic bodies 7a through 7f are cylindrically shaped. In addition to the operation for supporting the lens holder 2 on the support member 10, the linear elastic bodies 7a through 7f are also operable to supply current to the focusing coil 3, to the tilting coil 4, and to the tracking coil 5. The movable side terminals 8a through 8f are therefore connected to the focusing coil 3, to the tilting coil 4, and to the tracking coil 5 by electric wires.

Next, the operations of the device for driving optical system according to the second preferred embodiment will be discussed. The device of the second preferred embodiment is also controlled by moving coil system as in the first preferred embodiment. Therefore, control operations for focusing, tracking and tilting are basically the same as in the first preferred embodiment. Besides, as the linear elastic bodies 7a through 7f are conically shaped in the second preferred embodiment, the amount of interference in the movements in the focusing direction Fo and in tracking direction Tk to be caused by tilting control can be reduced to a greater degree. This is because the amount of interference resulting from tilting control varies in the length direction of the linear elastic bodies 7a through 7f. Therefore, the conically-shaped elastic bodies 7a through 7f produce movements in the focusing direction Fo and in the tracking direction Tk that are relatively smaller than those produced by the cylindrically-shaped elastic bodies 7a through 7f.

In the second preferred embodiment, the lens holder 2 is supported on the support member 10 by the six linear elastic bodies 7a through 7f. However, the number of the linear elastic body may not be limited to this. As long as the linear elastic body is arranged in the same manner as that in the second preferred embodiment, the same effect can be obtained.

<Third Preferred Embodiment>

Figure 12:
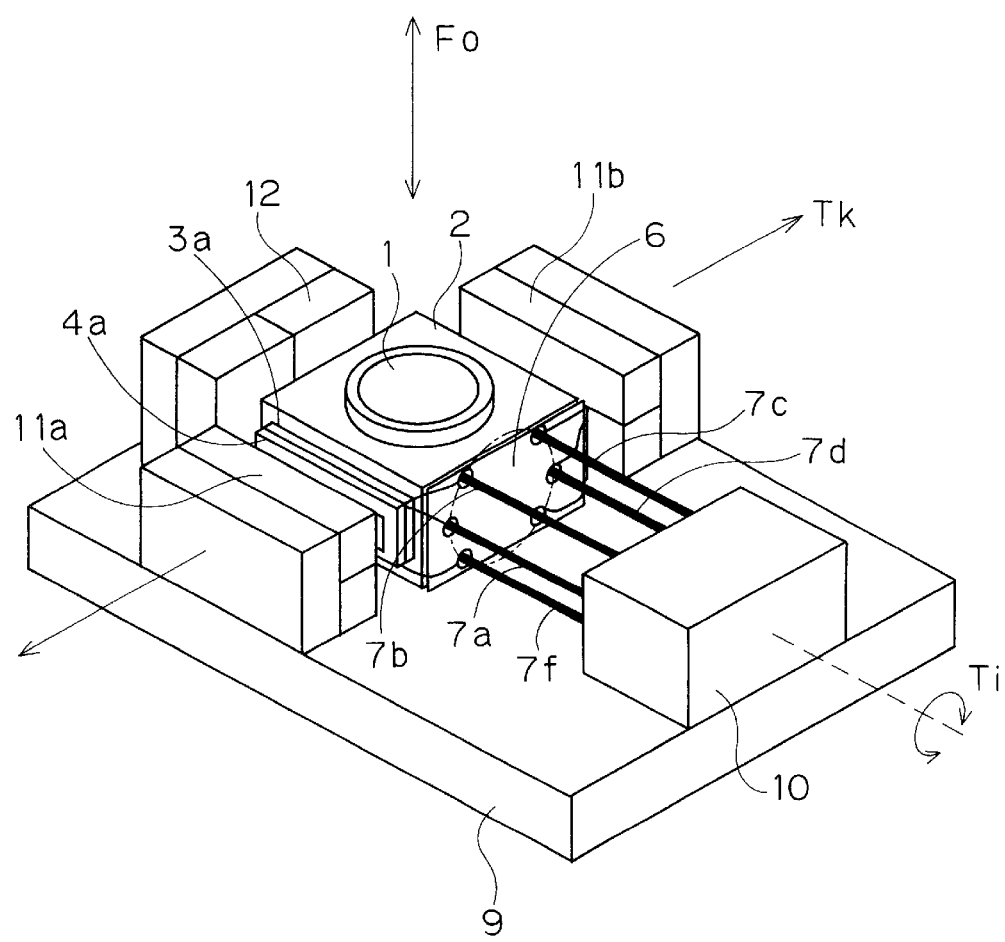
FIG. 12 is a perspective view illustrating a device for driving optical system according to a third preferred embodiment of the present invention.
Figure 13:
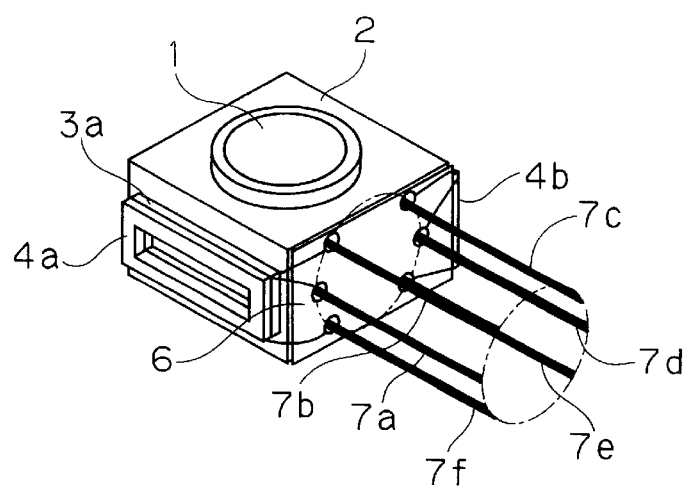
FIGS. 13 and 14 are perspective views each illustrating a lens holder of the device according to the third preferred embodiment of the present invention.
Figure 14:
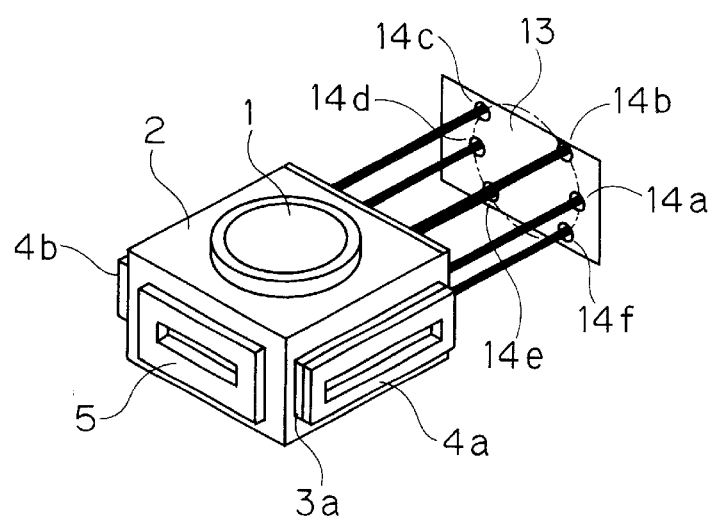

FIG. 12 is a perspective view illustrating a device for driving optical system according to the third preferred embodiment of the present invention. Only a lens holder of the device is illustrated in each perspective view of FIGS. 13 and 14. The structure of the lens holder 2 is the same as that in the first preferred embodiment. The objective lens 1 for focusing light on an optical recording medium (not shown) and irradiating the same with the focused light is held on the lens holder 2. The lens holder 2 has the focusing coil 3, the tilting coil 4, and the tracking coil 5 provided on three surfaces thereof adjacent to the surface for holding the objective lens 1. Further, the lens holder 2 has the movable side substrate 6 on the surface thereof opposite to that for holding the tracking coil 5. Still further, in contrast to the lens holder 2 in the first preferred embodiment, the lens holder 2 in the third preferred embodiment is a rectangular parallelepiped having a small thickness in the focusing direction Fo.

Figure 15:
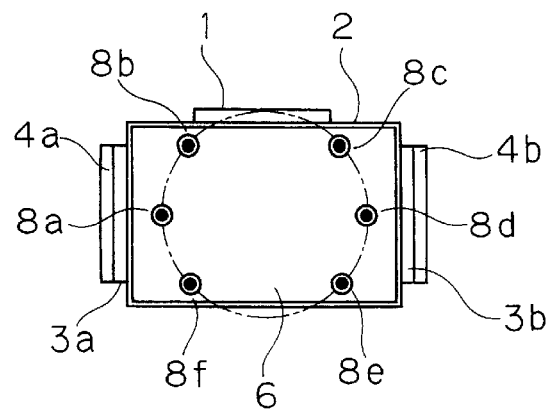
FIG. 15 is a plan view illustrating a movable side substrate according to the third preferred embodiment of the present invention.

FIG. 15 is a plan view illustrating the movable side substrate. The movable side substrate 6 is a rectangle having a short side in the focusing direction Fo. The six movable side terminals 8a through 8f are provided on the movable side substrate 6 for fixing the ends of the six linear elastic bodies 7a through 7f, respectively. These movable side terminals 8a through 8f are arranged in a circle. A center of this circle is an axis of point symmetry of the movable side terminals 8a through 8f. Further, distances between the movable side terminals 8a through 8f adjacent to each other in the focusing direction Fo are shorter than those between the terminals 8a through 8f adjacent to each other in a direction perpendicular to the focusing direction Fo. For example, the distance between the movable side terminals 8a and 8b is shorter than the distance between the movable side terminals 8a and 8d.

The structure of the base member 9 as a foundation of the device is the same as that in the first preferred embodiment. More particularly, the base member 9 holds the support member 10 provided thereon for supporting the lens holder 2. Further provided on the base member 9 are the permanent magnet 11 for focusing and tilting control, and the permanent magnet 12 for tracking control. Further, the fixed side substrate 13 is provided on the surface of the support member 10 for supporting the lens holder 2. To comply with the shape of the lens holder 2, the support member 10 and the permanent magnet 11, for example, are each rectangular parallelepiped having a small thickness in the focusing direction Fo.

Figure 16:
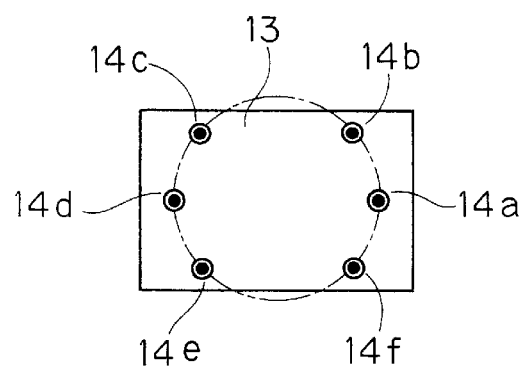
FIG. 16 is a plan view illustrating a fixed side substrate according to the third preferred embodiment of the present invention.
Figure 17:
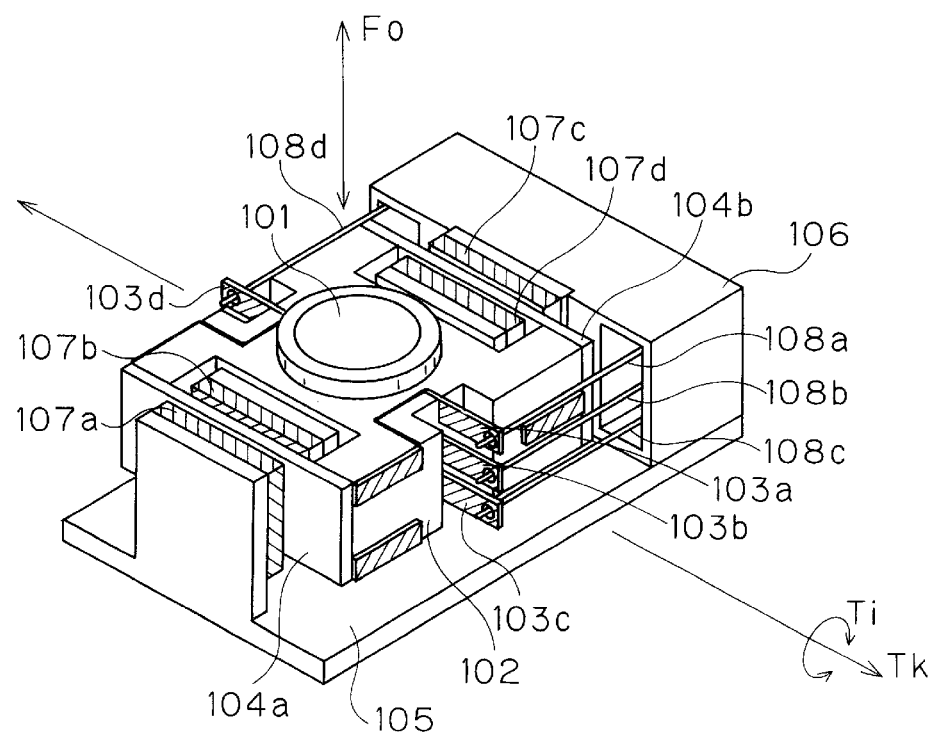
FIG. 17 is a perspective view illustrating a background-art device for driving optical system.
Figure 18:
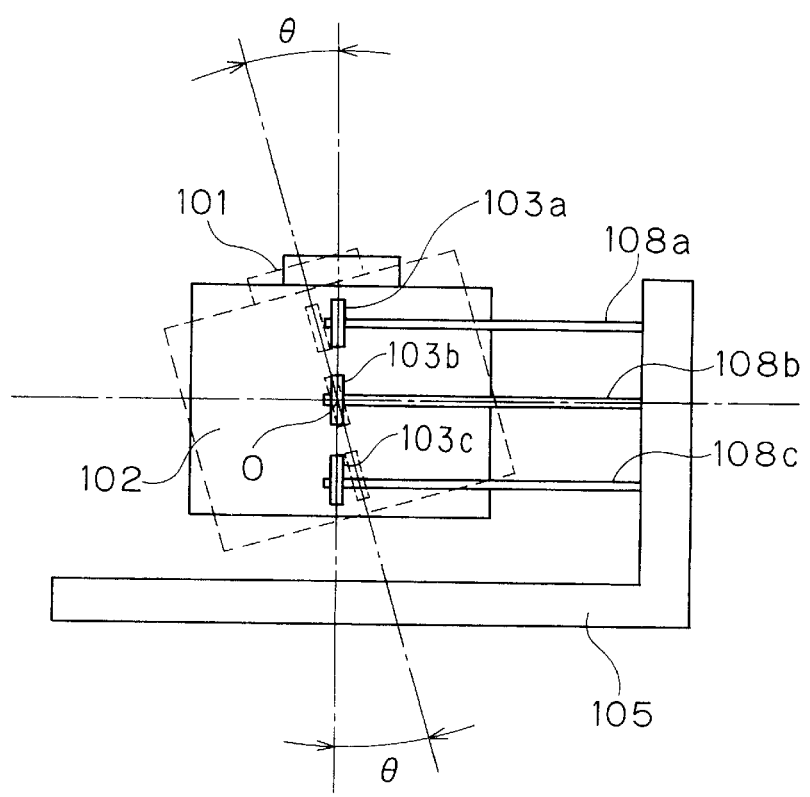
FIG. 18 is a sectional view illustrating movement of a lens holder caused by tilting control in the background-art device for driving optical system.

FIG. 16 is a plan view illustrating the fixed side substrate. To comply with the shape of the movable side substrate 6, the fixed side substrate 13 is also a rectangle as well having a short side in the focusing direction Fo. The six fixed side terminals 14a through 14f are provided on the fixed side substrate 13 for further fixing the ends of the six linear elastic bodies 7a through 7f, respectively. These fixed side terminals 14a through 14f are also arranged in a circle. A center of this circle is an axis of point symmetry of the fixed side terminals 14a through 14f. Further, distances between the fixed side terminals 14a through 14f adjacent to each other in the focusing direction Fo are shorter than those between the terminals 14a through 14 adjacent to each other in a direction perpendicular to the focusing direction Fo. For example, the distance between the fixed side terminals 14c and 14d is shorter than the distance between the terminals 14c and 14b. The movable side terminals 8a through 8f and the fixed side terminals 14a through 14f are symmetrically arranged in mirror image, respectively. Further, the circle formed by the movable side terminals 8a through 8f and that formed by the fixed side terminals 14a through 14f are approximately the same in size.

Similar to the first preferred embodiment, the movable side substrate 6 and the fixed side substrate 13 are also connected by the six linear elastic bodies 7a through 7f having the same length, to support the lens holder 2 on the support member 10. The ends of the linear elastic bodies 7a through 7f are arranged in the same manner as those of the movable side terminals 8a through 8f and the fixed side terminals 14a through 14f, namely, they are arranged in a circle. A center of the circle formed by the ends of the elastic bodies 7a through 7f is an axis of point symmetry thereof. Further, distances between the ends of the elastic bodies 7a through 7f adjacent to each other in the focusing direction Fo are shorter than those between the ends thereof adjacent to each other in a direction perpendicular to the focusing direction Fo. Accordingly, in the device of the third preferred embodiment, the linear elastic bodies 7a through 7f are cylindrically shaped. In addition to the operation for supporting the lens holder 2 on the support member 10, the linear elastic bodies 7a through 7f are also operable to supply current to the focusing coil 3, to the tilting coil 4, and to the tracking coil 5. The movable side terminals 8a through 8f are therefore connected to the focusing coil 3, to the tilting coil 4, and to the tracking coil 5 by electric wires.

According to the foregoing configuration, while being operative in the same manner as that in the first preferred embodiment, shrinkage is allowed in the focusing direction Fo in the device of the third preferred embodiment as compared with the device of the first preferred embodiment. As a result, reduction in thickness of a device is also allowed that includes the device of the third preferred embodiment incorporated therein. The operations of the device for driving optical system of the third preferred embodiment are the same as those of the device according to the first preferred embodiment and therefore, the description thereof is omitted.

In the third preferred embodiment, the lens holder 2 is supported on the support member 10 by the six linear elastic bodies 7a through 7f. However, the number of the linear elastic body may not be limited to this. As long as the linear elastic body is arranged in the same manner as that in the third preferred embodiment, the same effect can be obtained.

While the invention has been shown and described in detail, the foregoing description is in all aspects illustrative and not restrictive. It is therefore understood that numerous modifications and variations can be devised without departing from the scope of the invention.

What is claimed is:

1. A device for driving optical system, comprising:

an optical system for focusing light on an optical recording medium and irradiating said optical recording medium with focused light;

a holder for holding said optical system;

a support member for supporting said holder;

a support system including at least six linear elastic bodies having the same length, said linear elastic bodies respectively having one ends fixed to said support member and arranged thereon approximately in a circle, and other ends fixed to said holder and arranged thereon approximately in a circle, to support said holder on said support member;

a focusing drive system for driving said holder in a direction of an optical axis of said optical system;

a tracking drive system for driving said holder in a radial direction of said optical recording medium; and a tilting drive system for driving said holder in a direction in which rotation moment generates about an axis, said axis being perpendicular to said direction of said optical axis and to said radial direction of said optical recording medium.

2. The device according to claim 1, wherein in said support system, said ends of said linear elastic bodies on said support member and said ends of said linear elastic bodies on said holder have respective axes of point symmetry.

3. The device according to claim 1, wherein in said support system, distances between adjacent ones of said ends of said linear elastic bodies on said support member and distances between adjacent ones of said ends of said linear elastic bodies on said holder are all the same, respectively.

4. The device according to claim 1, wherein in said support system, said circle formed by said ends of said linear elastic bodies on said support member and said circle formed by said ends of said linear elastic bodies on said holder are approximately the same in size.

5. The device according to claim 1, wherein in said support system, said circle formed by said ends of said linear elastic bodies on said support member and said circle formed by said ends of said linear elastic bodies on said holder are different in size.

6. The device according to claim 1, wherein in said support system, both on said support member and on said holder, distances between said ends of said linear elastic bodies adjacent to each other in said direction of said optical axis are shorter than distances between said ends of said linear elastic bodies adjacent to each other in a direction perpendicular to said direction of said optical axis.

7. The device according to claim 1, wherein in said support system, said at least six linear elastic bodies include the same material.

* * * * *